(12) United States Patent
Blue

(10) Patent No.: US 10,832,169 B2
(45) Date of Patent: Nov. 10, 2020

(54) INTELLIGENT SERVICE NEGOTIATION USING COGNITIVE TECHNIQUES

(71) Applicant: INTERNATIONAL BUSINESS MACHINES CORPORATION, Armonk, NY (US)

(72) Inventor: Thomas J. Blue, San Diego, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 786 days.

(21) Appl. No.: 15/486,678

(22) Filed: Apr. 13, 2017

(65) Prior Publication Data

US 2018/0300647 A1 Oct. 18, 2018

(51) Int. Cl.
| | |
|---|---|
| G06N 5/04 | (2006.01) |
| G06N 20/00 | (2019.01) |
| G06Q 10/08 | (2012.01) |
| H04L 29/08 | (2006.01) |

(52) U.S. Cl.
CPC ............ *G06N 20/00* (2019.01); *G06N 5/04* (2013.01); *G06Q 10/087* (2013.01); *H04L 67/10* (2013.01)

(58) Field of Classification Search
None
See application file for complete search history.

(56) References Cited

U.S. PATENT DOCUMENTS

| | | |
|---|---|---|
| 7,149,698 B2 | 12/2006 | Guheen et al. |
| 2001/0056361 A1 | 12/2001 | Sendouda |
| 2004/0133526 A1 | 7/2004 | Shmueli et al. |

FOREIGN PATENT DOCUMENTS

| | | |
|---|---|---|
| JP | 2005128990 A | 5/2005 |
| KR | 101081011 B1 | 11/2011 |

OTHER PUBLICATIONS

Faratin, Automated Service Negotiation Between Autonomous Computational Agents, Doctoral Thesis, Queen Mary & Westfield College, 2000 (Year: 2000).*
Tbahriti, et al., Privacy-Enhanced Web Service Composition, IEEE Transactions on Service Computing, vol. pp. No. 99 (2013) pp. 1-14 (Year: 2013).*
Ortiz, Jr., et al., Task Inference and Distributed Task Management in the Centibots Robotic System, AAMAS'05, 2005, pp. 860-867 (Year: 2005).*
"Corporate Travel Managers Seek More Tools to Control Car Rental Costs, Survey Commissioned by eCLIPSE Advisors & Abrams Consulting Group, Inc. Says," Business Wire, 2002 (2 pages).
"Priceline iPhone App Now Negotiates Car Rental Rates," PC Magazine Online, 2010 (3 pages).

* cited by examiner

*Primary Examiner* — Wilbert L Starks
(74) *Attorney, Agent, or Firm* — Griffiths & Seaton PLLC

(57) ABSTRACT

Embodiments for intelligent service negotiation by a processor in a cloud computing environment. One or more data points may be analyzed based on one or more service provider cost components received from one or more service providers for a service. A negotiation model may be generated using a machine learning model reflecting actual costs of the service based on the analyzed data points. A user may be cognitively consulted according to the negotiation model to provide one or more consultative recommendations for selecting the service by the one or more service providers.

20 Claims, 16 Drawing Sheets

SERVICE PROVIDER     ACCOUNT YEARLY SCORECARD

| TOP CITIES BY REVENUE | % |
|---|---|
| LACSING CENTRAL MICHIGAN | 1.59% |
| DARBY PENNSYLVANIA | 1.81% |
| JANESVILLE WISCONSIN | 1.34% |
| LEXINGTON SOUTH CAROLINA | 1.03% |
| COVINGTON PIKE TENNESSEE | 1.61% |
| GG HAMMOND INDIANA | 1.17% |
| 53A6 APEX NORTH CAROLIANA | 1.35% |
| EASTPOINTE 9 MILE GRATIOT MICHIGAN | 1.16% |
| HICKSVILLE NEW YORK | 1.10% |
| MIDDLE VILLAGE NEW YORK | 1.02% |
| TOP 10 CITIES REPRESENT: | 13.18% |

| RENTAL INFORMATION FOR TIMEFRAME | |
|---|---|
| # RENTAL TRANSACTIONS | 1262 |
| CHARGE DAYS | 35585 |
| ONE WAY TRANSACTIONS | 0 |
| AVG RATE PER DAY | $25.26 |
| AVG MILES PER DAY | 50 |
| AVG RENTAL LENGTH | 28.20 |
| REVENUE | $898.894 |

| RESERVATION SOURCE | % |
|---|---|
| CALL CENTER | 66.42% |
| WALKUP | 30.73% |
| INTERNET | 1.88% |
| BRANCH | 0.66% |
| GDS | 0.31% |
| TOTAL | 100% |

| CAR CLASS | CHARGED | DRIVEN | COMPLIANCE |
|---|---|---|---|
| ECAR ECONOMY | 14 | 36 | 2.81% |
| CCAR COMPACT | 866 | 441 | 58.62% |
| MIDSIZE | 279 | 554 | 31.11% |
| FCAR FULLSIZE | 52 | 126 | 4.12% |
| PCAR PREMIUM | 1 | 0 | 0.08% |
| SSAR SPORT | 4 | 5 | 0.32% |
| MVAR MINIVAN 7 SEATS | 9 | 16 | 0.41% |
| SPAR P/UP SMALL | 1 | 5 | 0.08% |
| PPAR P/UP LARGE | 6 | 17 | 0.48% |
| IGAR X-OVER INTERMED | 4 | 5 | 0.32% |
| IRAR SUV INTERMEDIAT | 10 | 25 | 0.39% |
| IFAR SUV INTERMEDIAT | 4 | 11 | 0.22% |
| FGAR X-OVER FULLSIZE | 2 | 3 | 0.16% |
| SRAR SUV STANDARD 2 | 2 | 5 | 0.16% |
| SFAR SUV STANDARD 4 | 1 | 3 | 0.08% |
| PGAR X-OVER PREMIUM | 1 | 2 | 0.04% |
| FFAR SUV LARGE 4WD | 2 | 0 | 0.20% |
| FCAH HYBRID FULLSIZE | 3 | 6 | 0.12% |
| FBOX 24 FT BOX | 1 | 0 | 0.08% |
| FRAR SUV LARGE 2WD | 0 | 1 | 0.01% |
| STAR CONVERTIBLE | 0 | 1 | 0.01% |
| TOTAL | 1262 | 1262 | 100.00% |

| | REVENUE | |
|---|---|---|
| QTR | 2013 | 2014 |
| 1 | $62,161.90 | $70,748.75 |
| 2 | $32,626.80 | $202,550.10 |
| 3 | $34,184.71 | $315,184.73 |
| 4 | $93,299.61 | $310,410.08 |
| Total | $222,273.02 | $898,892.91 |

| RENTAL CAR INC. | |
|---|---|
| TOTAL | |

FIG. 5B

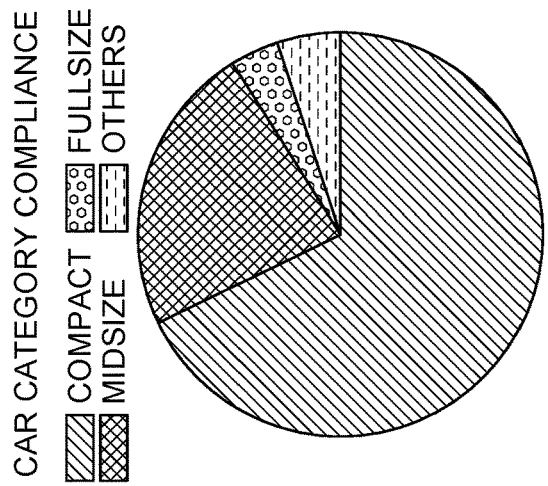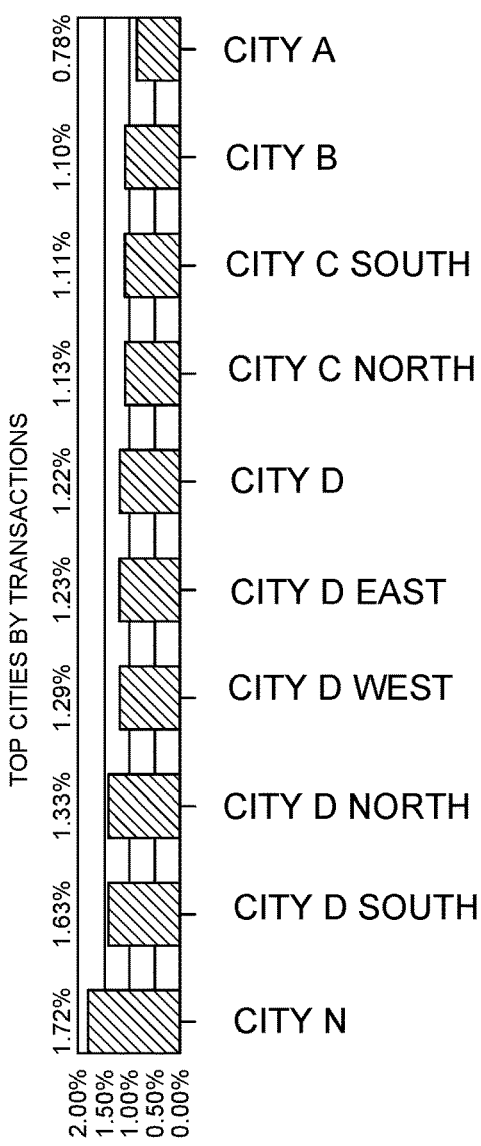
FIG. 5C

SUMMARY BY CATEGORY

| INCUMBENT COMMON TYPE | INCUMBENT - CURRENT COST | PROPOSAL #1 BID COST | PROPOSAL #1 BID COST | PROPOSAL #1 BID COST | PROPOSAL #1 BID COST | PROPOSAL #1 BID COST |
|---|---|---|---|---|---|---|
| DAILY RATES - US | $425,725 | $424,390 | $432,864 | $413,706 | $0 | $0 |
| DAILY RATES - CA | $14,684 | $14,796 | $14,335 | $13,699 | $0 | $0 |
| FLORIDA RATE | $51,392 | $51,281 | $52,285 | $49,781 | $0 | $0 |
| ONE WAY | $54,085 | $54,085 | $44,122 | $44,122 | $0 | $0 |
| CITY SURCHARGES | $71,685 | $61,338 | $79,010 | $79,571 | $0 | $0 |
| ONE WAY SURCHARGE | $1,365 | $1,351 | $11,610 | $11,610 | $0 | $0 |
| WEEKLY FACTOR | $149,265 | $145,008 | $161,160 | $153,780 | $0 | $0 |
| MONTHLY | $8,328 | $7,898 | $8,832 | $8,400 | $0 | $0 |
| GPS FEE | $10,664 | $10,664 | $10,664 | $10,664 | $0 | $0 |
| FREQUENT FLYER FEES | $2,169 | $2,169 | $2,169 | $2,169 | $0 | $0 |
| ENERGY RECOUPMENT FEE | $0 | $0 | $0 | $0 | $0 | $0 |
| REFUEL | $25,139 | $25,139 | $25,139 | $25,139 | $0 | $0 |
| REBATE | ($18,000) | ($36,000) | $0 | $0 | | |
| PRIMARY BID COST | $814,501 | $798,119 | $813,650 | $813,641 | $ - | $ - |
| BACK END REBATE | $ (18,000) | $ (36,000) | $ - | $ - | $ - | $ - |
| SPECIAL CITY RATE | | $ (2,061) | | | | |
| MANCHESTER, NH | | | | | | |
| NET CLIENT COST | $796,501 | $760,058 | $813,650 | $813,641 | $ - | $ - |
| RATE PER DAY | $45.23 | $39.75 | $38.76 | $37.76 | | |

FIG. 6

| ACTION | RESULT | DEPENDENCY |
|---|---|---|
| COMPACT TO FULL SIZE DAILY RATES | $2 REDUCTION IN VEHICLE RATE | COMPLIANCE IN COMPACT TO FULL SIZE USAGE |
| INTRODUCE ONE WAY RATE | $0.05 REDUCTION IN COST PER MILE | DO NOT MIX LOCAL AND ONE WAY RENTALS |
| CITY SURCHARGE ANALYSIS | LOWER SURCHARGES IN THE FOLLOWING AIRPORT: ATL - $0; DFW - $3; ORD - $10; BOS - $10; SFO - $5 | FUTURE USAGE IN SURCHARGE CITIES STAYS CONSISTENT |
| REBATE NEGOTIATION | REBATE: INCREASE FROM 5% TO 10% | SUPPLIER COUNTS MARKET RATE REVENUE IN REBATE |

TRAVEL AND TRANSPORTATION

CLIENTS NEWS RECAP

PARCEL SERVICE
NO NEWS

RENTAL CAR PROVIDER 1
RENTAL CAR PROVIDER 1 APPOINTS EXECUTIVE VICE PRESIDENT AND CHIEF MARKETING OFFICER
DIRECTOR JOHN DOE IS JOINING RENTAL CAR PROVIDER 1 GLOBAL HOLDING, INC. AS EXECUTIVE VICE PRESIDENT
AND CHIEF MARKETING OFFICER LATER THIS MONTH. DIRECTOR JOHN DOE WILL LEAD MARKETING STRATEGY FOR
THE RENTAL CAR PROVIDER 1, RENTAL CAR PROVIDER 2, RENTAL CAR PROVIDER 3 AND RENTAL CAR PROVIDER 4
BRANDS, INCLUDING CUSTOMER EXPERIENCE, E-COMMERS, LOYALTY PROGRAM, CUSTOMER RELATIONSHIP
MANAGEMENT, SOCIAL MEDIA AND ANCILIARY REVENUE GENERATION EFFORTS WORLDWIDE

AIRLINES PROVIDER 1
AIRLINES PROVIDER 1 REPORTS 20% DROP IN AIR CARGO REVENUE
AIRLINES PROVIDER 1 SAYS DEMAND FOR MOVING FREIGHT BY AIR PLUNGED AS WEST COAST PORTS RECOVERED
FROM A SLOWDOWN

AIRLINES PROVIDER 2
AIRLINES PROVIDER 2, AIRLINES PROVIDER 3 MERGE RESERVATION SYSTEMS THIS WEEKEND
AIRLINES PROVIDER 1 AND AIRLINES PROVIDER 2 OFFICEALLY BECOME ONE ON SATURDAY. OKAY, THEY FINALIZED
THEIR $17.7 BILLION MERGER NERELY TWO YEARS AGO, BUT THIS WEEKEND THEY INTEGRATE THEIR RESERVATIONS
SYSTEMS. AS WE ALL KNOW FROM EXPERIENCE, THAT CAN BE PAIN FOR TRAVELERS.

FIG. 11

INTELLIGENT SERVICE NEGOTIATION USING COGNITIVE TECHNIQUES

BACKGROUND OF THE INVENTION

Field of the Invention

The present invention relates in general to computing systems, and more particularly to, various embodiments for intelligent service negotiation using cognitive techniques by a processor in a cloud computing environment.

Description of the Related Art

In today's interconnected and complex society, computers and computer-driven equipment are more commonplace. Processing devices, with the advent and further miniaturization of integrated circuits, have made it possible to be integrated into a wide variety of devices for personal, business, health, home, education, scientific, or governmental related areas of interest. Accordingly, the use of computers, network appliances, and similar data processing devices continue to proliferate throughout society, particularly in the travel and service provider environment.

SUMMARY OF THE INVENTION

Various embodiments for intelligent service negotiation by a processor in a cloud computing environment, are provided. In one embodiment, by way of example only, a method for intelligent service negotiation modeling, again by a processor, is provided. One or more data points may be analyzed based on one or more service provider cost components received from one or more service providers for a service. A negotiation model may be generated using a machine learning model reflecting actual costs of the service based on the analyzed data points. A user may be cognitively consulted according to the negotiation model to provide one or more consultative recommendations for selecting the service by the one or more service providers.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5A-C is an additional block diagram depicting various exemplary service cost components entered into an intelligent service negotiation mechanism via cognitive machine learning in accordance with aspects of the present invention;

FIG. 6 is an additional block diagram depicting various projected service cost components by an intelligent service negotiation mechanism in accordance with aspects of the present invention;

FIG. 10 is a chart diagram for service provider shift modeling depicting use of cognitive actions and dependencies by an intelligent service negotiation mechanism in accordance with aspects of the present invention;

FIG. 11 is a chart diagram for a service provider shift modeling depicting use of artificial intelligence data gathering by an intelligent service negotiation mechanism in accordance with aspects of the present invention;

DETAILED DESCRIPTION OF THE DRAWINGS

Figure 1:
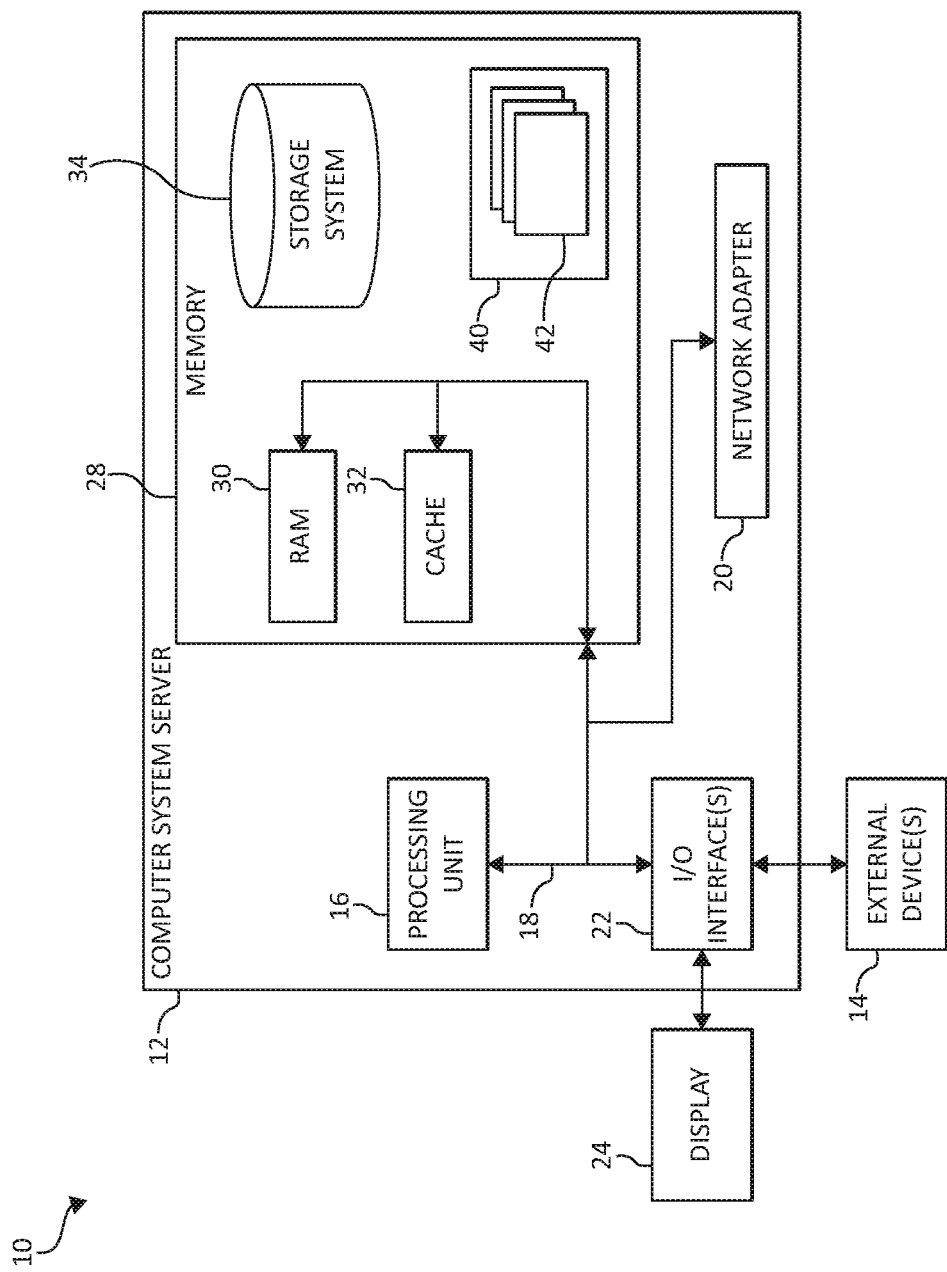
FIG. 1 is a block diagram depicting an exemplary computing node according to an embodiment of the present invention.

As computing systems continue to increase in technological advancement, the demand for sophisticated prediction, forecasting, and modeling of various services also grows. Many industries such as, for example, the transportation (e.g., rental car) industries, rely on critical information. Within the transportation industry such as, for example, the rental car industry, these service providers require relating to sophisticated revenue management programs to ensure they generate as much profit as possible within each corporate contract they have with a client. For example, some service provider contracts (e.g., car rental contracts) are complex, multi-page documents addressing one or more service provider cost components, each of which must be factored to determine total overall service program cost. Most managed travel programs typically simply compare a single cost component, such as a current base rate against the proposed rates to determine cost impact.

Currently, however, the transportation industry does not have a managed travel program enabling strategic, cognitive analyses of overall costs of a service program (e.g., a car rental program). Accordingly, a need exists for an artificial intelligence executing an intelligent service negotiation model to cognitively consult a transportation industry service provider (e.g., a car rental suppliers) with a sophisticated profit and loss ("P&L") model run against a client's contract to determine potential service provider costs (e.g., profits and losses "P&L") such as, for example, for car rental contracts that may be used for two to three year intervals.

Thus, the present invention provides for an intelligent service negotiation model using an artificial intelligence by a processor in a cloud computing environment. One or more data points may be analyzed based on one or more service provider cost components received from one or more service providers for a service. A negotiation model may be generated using a machine learning model reflecting actual costs of the service based on the analyzed data points. A user may be cognitively consulted with using an intelligent service negotiation mechanism according to the negotiation model to provide one or more consultative recommendations for selecting the service by the one or more service providers.

A cognitive analysis mechanism for one or more service providers may establish a learned baseline of current service provider cost, projected service provider cost of proposed services from one or more service providers. Cognitive intelligent service negotiation modeling may be provided for enabling cognitive consulting with a user thereby providing one or more negotiation strategies. The cognitive intelligent service negotiation enables benchmarking the service provider cost components to current market standards and artificial intelligence-based collection of market intelligence.

In an additional aspect, an interactive internet-based graphical user interface (GUI) associated with an internet-based computing device may be utilized in an organization's managed travel program to identify essential car rental cost components. The present invention provides for cognitive analysis of one or more data points to enable a machine learning mechanism to generate negotiation modeling to accurately calculate the overall true costs of the organization's current or proposed car rental contracts. The results of the analytics enable the machine learning mechanism to provide one or more models that strategically depict cost effects of current and proposed service provider agreements and to provide the requisite insight for supplier (e.g., service provider) negotiations with the goal of minimizing the client costs. The resulting output of the generated, negotiation model provides a user with cognitive consultations (e.g., a series of interactive communication messages between the cognitive intelligent service negotiation system and the user). The cognitive consultations may include one or more conclusions, recommendations, predicted outcomes, and/or actions having one or more dependencies enabling instantaneous understanding of possible outcomes of a potential outcome, or a combination thereof for negotiating certain service provider cost components. A level of degree of the cognitive consultation may be determined (e.g., a tiered level of conclusions, recommendations, predicted outcomes, and/or actions having one or more dependencies ranked according to those having a greatest negative and/or positive impact on the negotiation model) so as to enable the user to achieve their overall cost objective with the car rental category.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment or Internet of Things (IoT) network environment. Rather, embodiments of the present invention are capable of being implemented in conjunction with any other type of computing environment now known or later developed. It should be noted that the IoT is an emerging concept involving computing devices that may be embedded in objects, such as appliances, and connected through a network. An IoT network may include one or more IoT devices or "smart devices", which are physical objects such as appliances with computing devices embedded therein. Many IoT devices are independently operable, but they also may be paired with a control system or with a distributed control system such as one running over a cloud computing environment. The control system may include an end-to-end flow monitoring mechanism similar to the one described herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operable with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
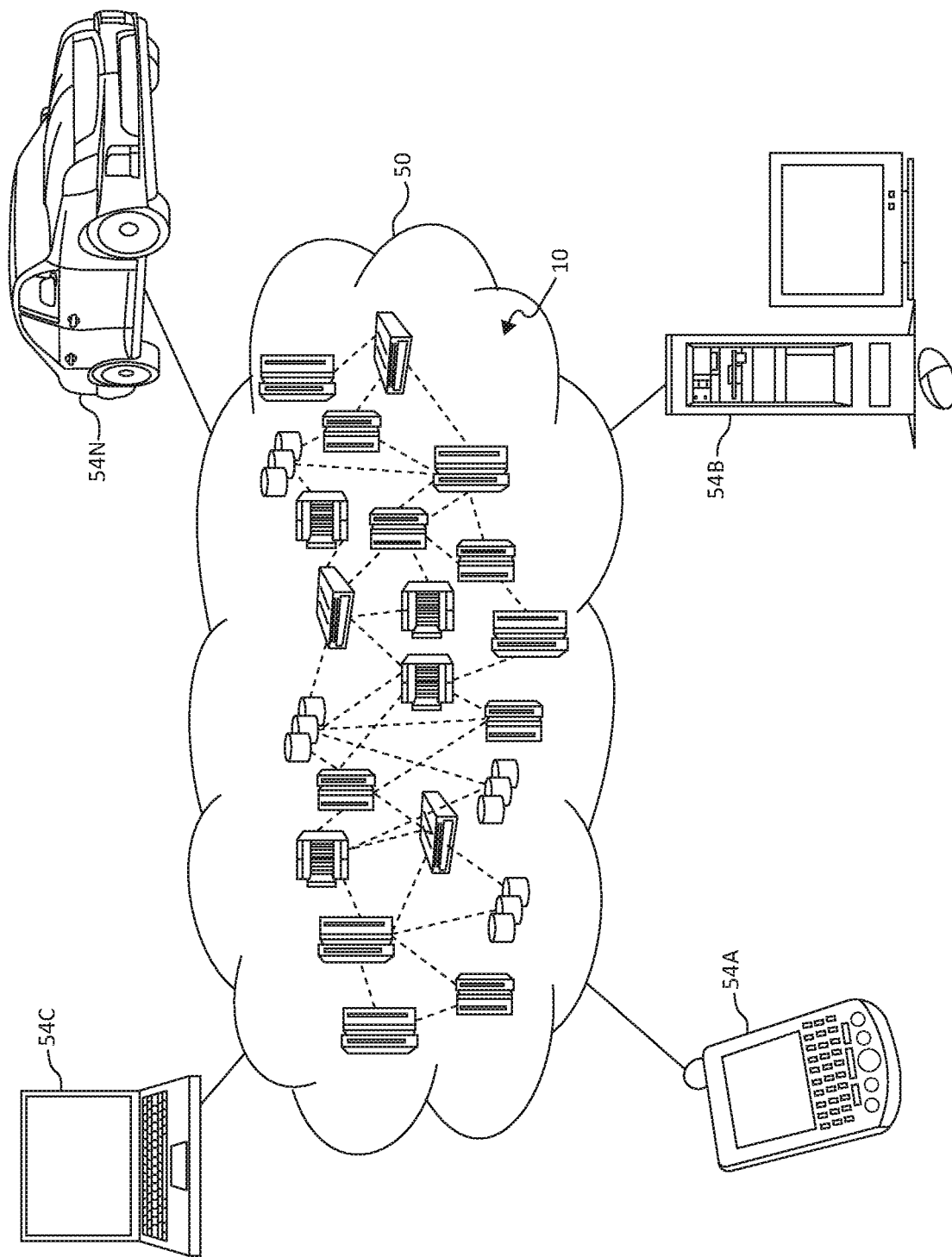
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid Clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
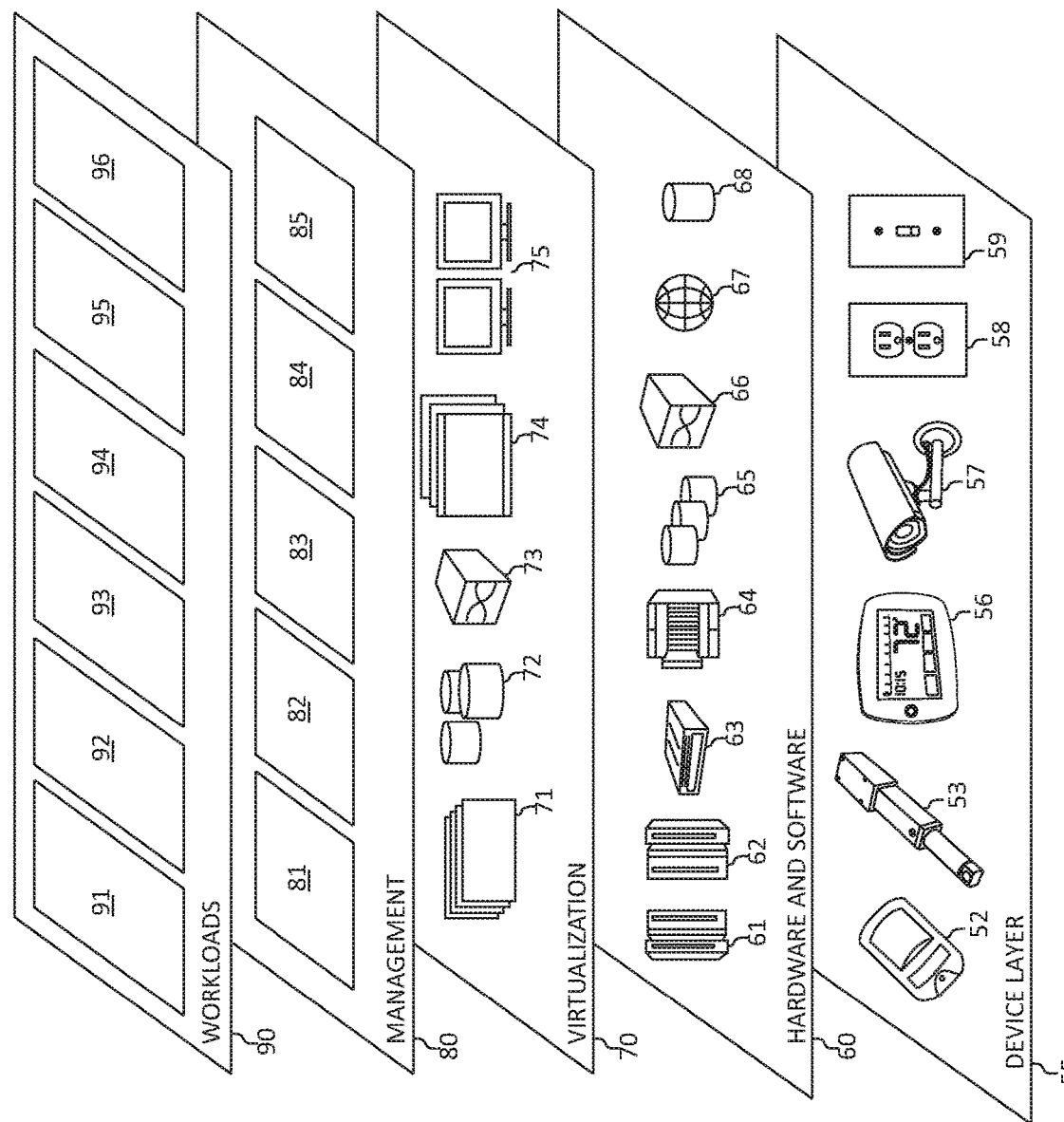
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various configuring settings for various computer-controlled devices for intelligent service negotiation workloads and functions 96. In addition, configuring settings for various computer-controlled devices using workloads and functions 96 for intelligent service negotiation may include such operations as data analysis (including data collection and processing from various environmental sensors), semantic analysis, image analysis, control input analysis, device analysis, and/or data analytics functions. One of ordinary skill in the art will appreciate that the configuring settings for various computer-controlled devices using workloads and functions 96 for intelligent service negotiation may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
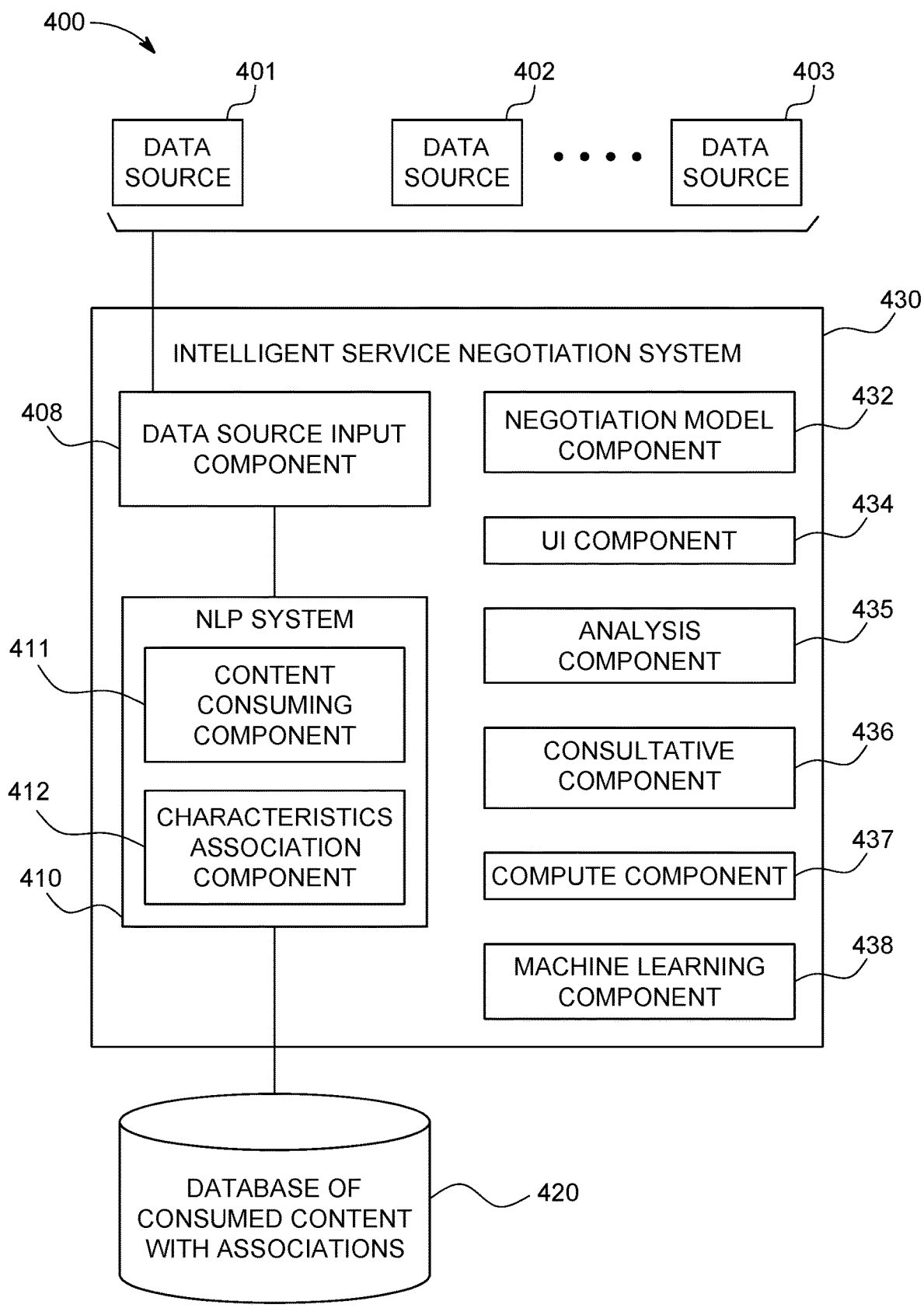
FIG. 4 is an additional block diagram depicting various user hardware and cloud computing components functioning in accordance with aspects of the present invention.

Turning now to FIG. 4, a block diagram of exemplary functionality 400 relating to intelligent service negotiation is depicted. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system for intelligent service negotiation in a cloud-computing environment in accordance with the present invention, such as those described in FIGS. 1-3. Many of the functional blocks 400 may execute as background processes on various components, either in distributed computing components, or on the user device, or elsewhere.

Multiple data sources 401-403 (e.g., data sources provided by one or more service provider or suppliers) may be provided as a corpus or group of data sources defined by a user. The data sources 401-403 may include, but are not limited to, data sources relating to service provider cost components received for a service (e.g., a contract proposal). The data sources 401-403 may be all of the same type, for example, a contract proposal by a supplier, pages or articles in a wiki or pages of a blog. Alternatively, the data sources 401-403 may be of different types, such as word documents, wikis, web pages, power points, printable document format, or any document capable of being analyzed by a natural language processing system.

In addition to text based documents, other data sources such as audio, video or image sources may also be used wherein the documents may be pre-analyzed to extract their content for natural language processing, such as converting from audio to text and/or image analysis.

The group of data sources 401-403 are consumed for an intelligent service negotiation system 430 using natural language processing (NLP) and artificial intelligence (AI) to provide processed content.

In one example, an instance of IBM® Watson® (IBM and Watson are trademarks of International Business Machines Corporation) NLP is used. The instance of Watson is provided and pointed at the group of data sources. The aspects of Watson that the described method and system makes use of are the technologies behind Alchemy Language (Alchemy Language is a trademark of International Business Machines Corporation). However, other NLP technologies or services may be used to provide the processed content as described herein.

The data sources 401-403 may be analyzed by an NLP system 410 to data mine the relevant information from the content of the data sources 401-403 in order to display the information in a more usable manner and/or provide the information in a more searchable manner. The NLP system 410 may be an instance of an NLP and AI tool such as Watson, which may be provided as a cloud service or as a local service.

The NLP system 410 may consume the multiple data sources 401-403 as selected by using a data source input component 408, including, for example, word docs such as, for example, a contract proposal, wikis, web pages, power points, Internet word docs, knowledge centers, anything that the NLP system 410 knows how to understand. This may extend to non-text based documents, by providing pre-analyzing of the content such as audio to text processing.

The NLP system 410 may include a content consuming component 411 for inputting the data sources 401-403 and running its NLP and AI tools against them, learning the content, such as by using the machine learning component 438. The content consuming component 411 may also mine the content consumed. As the NLP system 410 (including the machine learning component 438) learns different sets of data, a characteristics association component 412 (or "cognitive characteristics association component") may use the artificial intelligence to make cognitive associations or links between data sources 401-403 by determining common concepts, similar characteristics, and/or an underlying common topic.

Cognition is the mental process of knowing, including aspects such as awareness, perception, reasoning and judgment. An AI system uses artificial reasoning to interpret and analyze the data sources 401-403 and extract their topics or concepts. The learned topics and concepts may not be specifically named or mentioned in the data sources 401-403 and is derived by the AI interpretation.

The learned content of the data sources consumed by the NLP system may be merged into a database 420 or other data storage method of the consumed content with learned concepts of the data sources 401-403 providing association between the content referenced to the original data sources 401-403. The digital content of the original data sources 401-403 remains in the original data sources such as the wiki, web pages, etc., but the database 420 will have a logical understanding of how the original data sources 401-403 fit together using the power of the AI allowing for the concepts and therefore the associations or mappings between the data sources.

The merging of the data into one database 420 allows the intelligent service negotiation system 430 to act like a search engine, but instead of key word searches, it will use an AI method of making cognitive associations between the data sources using the deduced concepts.

The intelligent service negotiation system 430 may include a user interface ("UP") component 434 (e.g., an interactive graphical user interface "GUI" or an interactive voice dialog component) providing user interaction with the indexed content for mining and navigation and/or receiving one or more inputs/queries from a user.

The intelligent service negotiation system 430 may also include a negotiation model component 432 for receiving as the one or more service provider cost components current service cost components, proposed service cost components, and benchmarked service cost components and/or generating a negotiation model using a machine learning model reflecting actual costs of the service based on the analyzed data points. The negotiation model component 432 may initialize a machine learning mechanism, such as the machine learning component 438, using feedback information to detect one or more changes to the one or more service provider cost components effecting the negotiation model. The negotiation model component 432 may also assign at least a portion of a service to be performed by one of the one or more service providers according to a defined percentage rate. Once the NLP system 410 has carried out the linking of the data, the negotiation model component 432 may mine the associated concepts or similar characteristics from the database 420 of the consumed content to provide the most relevant sets of data sources for a topic being searched and use the associated concepts or similar characteristics to generate the negotiation model and cognitively consult the user.

The intelligent service negotiation system 430 may also include a consultative component 436 (e.g., a "service provider component" or "consultative consultant component") to cognitively consult a user according to a negotiation model to provide one or more consultative recommendations for selecting the service by the one or more service providers. The consultative consultant component 436 may provide the one or more consultative recommendations based on the negotiation model, or an updated negotiation model, by the UI component 434 (e.g., an interactive graphical user (GUI) interface or an interactive voice dialog component associated with the interactive GUI interface). It should be noted that the interactive GUI interface and the interactive voice dialog component may be associated with an internet-based computer hosting the intelligent service negotiation system 430 and/or external to and associated with the intelligent service negotiation system 430. Furthermore, the consultative consultant component 436, in association with the machine learning component 438, may collect feedback information via the UI component 434 from the user or one or more service providers according to the negotiation model or an updated negotiation model provided by the negotiation model component 432. The consultative consultant component 436 may also alert the user upon detecting one or more changes to the negotiation model, wherein the negotiation model includes the one or more service provider cost components and a plurality of dependency requirements associated with the one or more service provider cost components.

The intelligent service negotiation system 430 may also include an analysis component 435 to analyze one or more data points based on one or more service provider cost components received from one or more service providers for a service. More specifically, the analysis component 435 may analyze historical and observation data for collecting and gathering historical data and observational data for one or more service providers (e.g., suppliers).

The intelligent service negotiation system 430 may also include a compute component 437 for computing and/or determining a current service cost, proposed service cost, and benchmarked service cost and/or generating the negotiation model. The compute component 437 may work in conjunction with the negotiation model component 432 for predicting, generating, and/or updating a negotiation model reflecting actual costs of a service.

In one aspect, a calculation or computation operation of the compute component 437 may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

The compute component 437 and/or the machine learning component 438 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Consider the following example of various implementations of the aforementioned functionality as illustrated in FIGS. 5-6. With the foregoing in mind and as a preliminary matter, the systems 500 and 600 of FIGS. 5-6 respectively, may also be incorporated into various hardware and software components of the intelligent service negotiation system 430 of FIG. 4 in accordance with the present invention, such as those described in FIGS. 1-4.

Specifically, FIG. 5A-C are diagrams/graphs 500 depicting various exemplary service cost components entered into an intelligent service negotiation system 430 via cognitive machine learning. That is, FIG. 5A-C depicts one or more service providers providing historical data points (e.g., rental car history data points) used by the intelligent service negotiation system 430 of FIG. 4 for cognitive machine learning. For example, the data points may relate to one or more topics or subtopics such as, for example, revenue data by city, rental car information for a selected time frame, revenue data, data points relating to a classification of a car and associated subtopics, compliance data, and/or transaction data for ranked or "top" performing cities, vehicle class data (e.g., economy class, compact class, full size class, luxury class, and the like data), vehicle code data, daily rate/cost data, and/or one-way daily rate data, local and/or national surcharge data, refueling rate data, global position satellite ("GPS") data, fees, monthly rates, one day surcharge, base rates, rebates, city rates, weekly rates, city surcharges, a plurality of other defined costs, and/or a combination thereof.

Turning now to FIG. 6, a diagram 600 depicting various projected service cost components by an intelligent service negotiation system 430 of FIG. 4. That is, the intelligent service negotiation system 430 may calculate the projected total cost and rate of a service per day. The intelligent service negotiation system 430 may do so by inputting historical data (e.g., rental history data) for the service provider cost components (e.g., via the proposal bids such as proposal bid #1) along with the current and/or proposed service provider cost components from the service provider contracts to cognitively analyze, determine, and calculate the service provider cost components for each component along with an overall service provider contract cost. All service provider cost components may be currently visible via an interactive web portal or GUI for a user and/or a service provider. The intelligent service negotiation system 430 may use the data points to derive a logical, relevant negotiation model.

Figure 7:
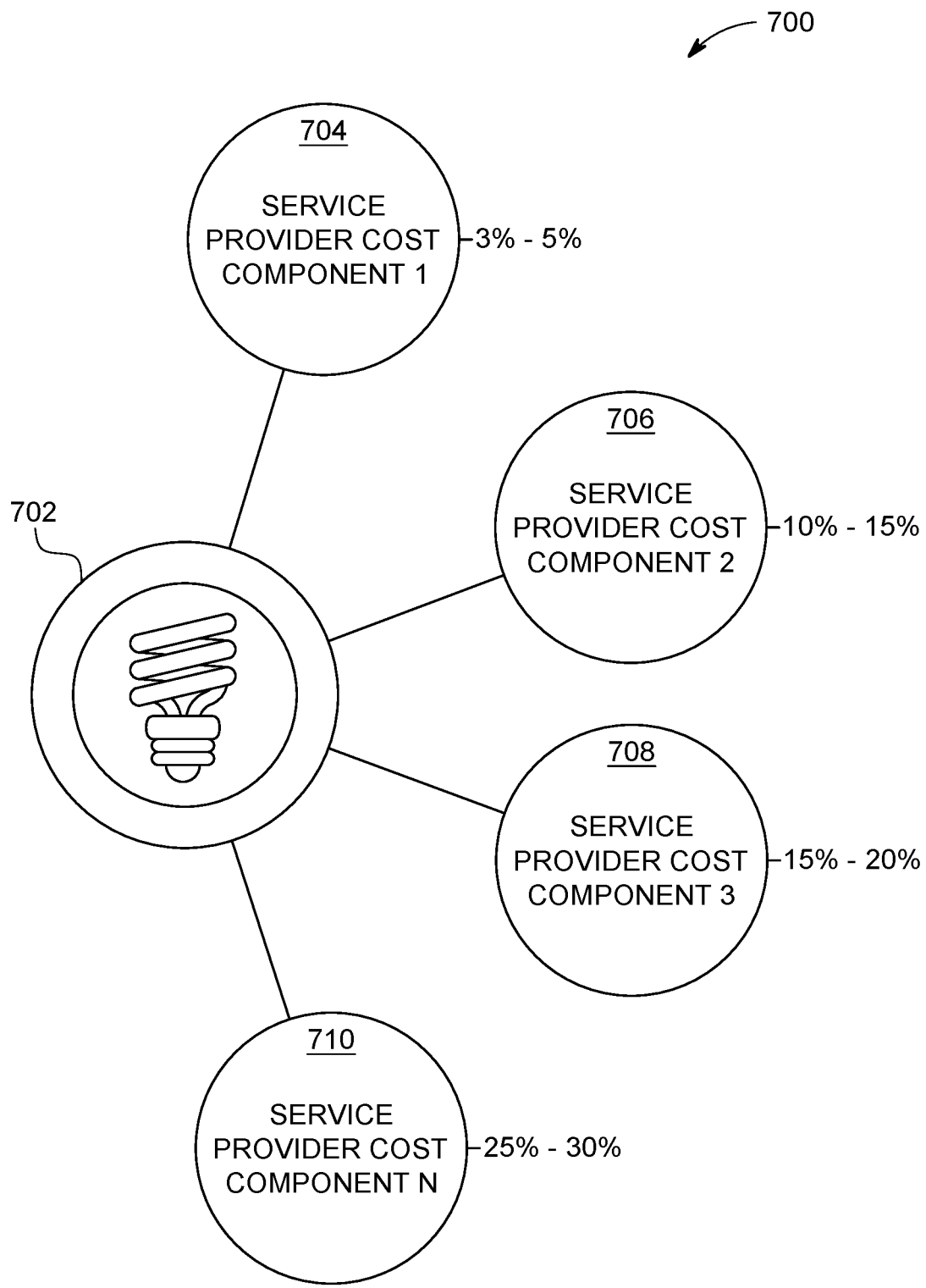
FIG. 7 is a block/flow diagram depicting cognitively determined service cost component saving opportunities by an intelligent service negotiation mechanism in accordance with aspects of the present invention.

In view of FIGS. 1-6, consider, as an illustration of exemplary functional blocks to accomplish various purposes of the present invention, FIG. 7, following. FIG. 7 illustrates exemplary functional blocks 700 for cognitively determining service cost component saving opportunities by an intelligent service negotiation mechanism on specific functionality. Each of the functional blocks 700 may be implemented in hardware and/or software, such as by the computer/server 12 (FIG. 1), and/or the workloads layer 90 (FIG. 3).

In the depicted embodiment, an intelligent service negotiation system 702 may generate a negotiation model using a machine learning model reflecting actual cost saving opportunities by one or more service provider cost components (e.g., service provider cost components 1, 2, 3, and N) received from one or more service providers of a service. For example, service provider cost component 1 "704" may be for a "one way rate" service cost. Service provider cost component 2 "706" may be for "city surcharge" service costs. Service provider cost component 3 "708" may be for "daily rental rate" service costs. Service provider cost component N "710" may be for "rebate" service costs. Using the negotiation model, the intelligent service negotiation system 702 cognitively consults a user according to the negotiation model to provide one or more consultative recommendations for selecting the service by the one or more service providers. For example, the intelligent service negotiation system 702 cognitively consults a user that a service provider cost component 1 "704" (e.g., a one way rate) may yield a 3% to 5% savings opportunity. The intelligent service negotiation system 702 cognitively consults a user that a service provider cost component 2 "706" (e.g., city surcharges) may yield a 10% to 15% savings opportunity. The intelligent service negotiation system 702 cognitively consults a user that a service provider cost component 3 "708" (e.g., daily rental rate) may yield a 15% to 20% savings opportunity. The intelligent service negotiation system 702 cognitively consults a user that a service provider cost component N "710" (e.g., rebate) may yield a 25% to 30% savings opportunity.

Figure 8:
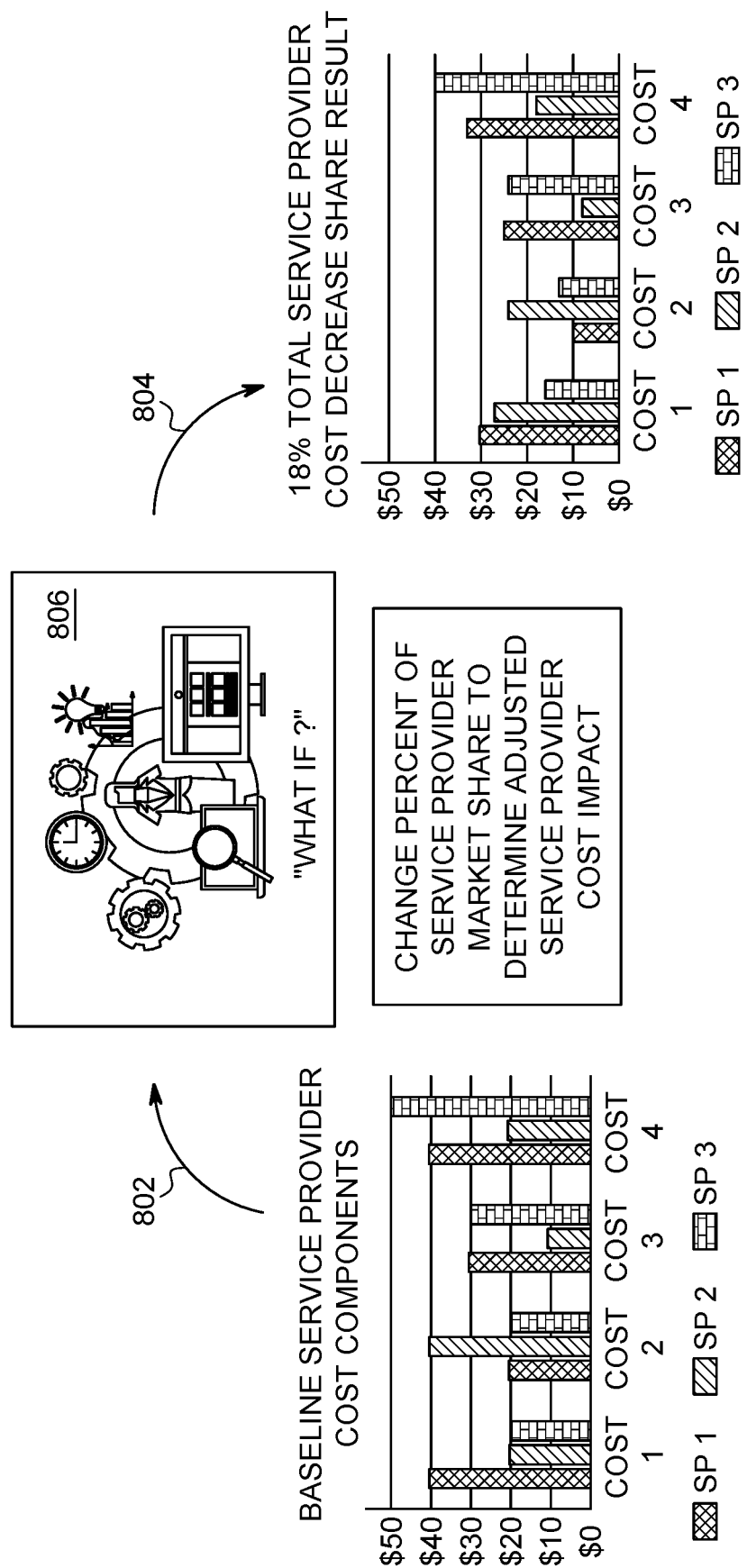
FIG. 8 is a block/flow diagram depicting a service provider shift modeling by an intelligent service negotiation mechanism in accordance with aspects of the present invention.

FIG. 8 is a block/flow diagram depicting a service provider shift modeling by an intelligent service negotiation mechanism. The block diagram of exemplary functionality 800 relating to intelligent service negotiation is depicted. As shown, the various blocks of functionality are depicted with arrows designating the blocks' 800 relationships with each other and to show process flow. Additionally, descriptive information is also seen relating each of the functional blocks 800. As will be seen, many of the functional blocks may also be considered "modules" or "components" of functionality, in the same descriptive sense as has been previously described in FIGS. 1-7. With the foregoing in mind, the module blocks 800 may also be incorporated into various hardware and software components of a system for intelligent service negotiation in accordance with the present invention, such as those described in FIGS. 1-7.

An intelligent service negotiation component 806 may receive one or more baseline service provider cost components for one or more service providers ("SP") (e.g., service provider cost components "costs" 1-4 for SP1, SP2, and SP3), as in block 802. Using cognitive analysis and modeling, the intelligent service negotiation component 806 may generate one or more negotiation models indicating various predictions and results for changing a percentage of market share for a service to be provided by one or more service providers to determine an adjusting service provider cost component impact, as in block 804. That is, the intelligent service negotiation component 806 cognitively assesses and generates in the modeling the impact upon a service provider cost component based on the percentage rate the service provider has for performing the service. For example, the intelligent service negotiation component 806 cognitively consults a user for negotiating a service by indicating that an 18% total service provider cost component decrease is achieved by adjusting the market share for the service provider cost components for the service providers (e.g., service provider cost components "costs" 1-4 for SP1, SP2, and SP3).

Figure 9A:
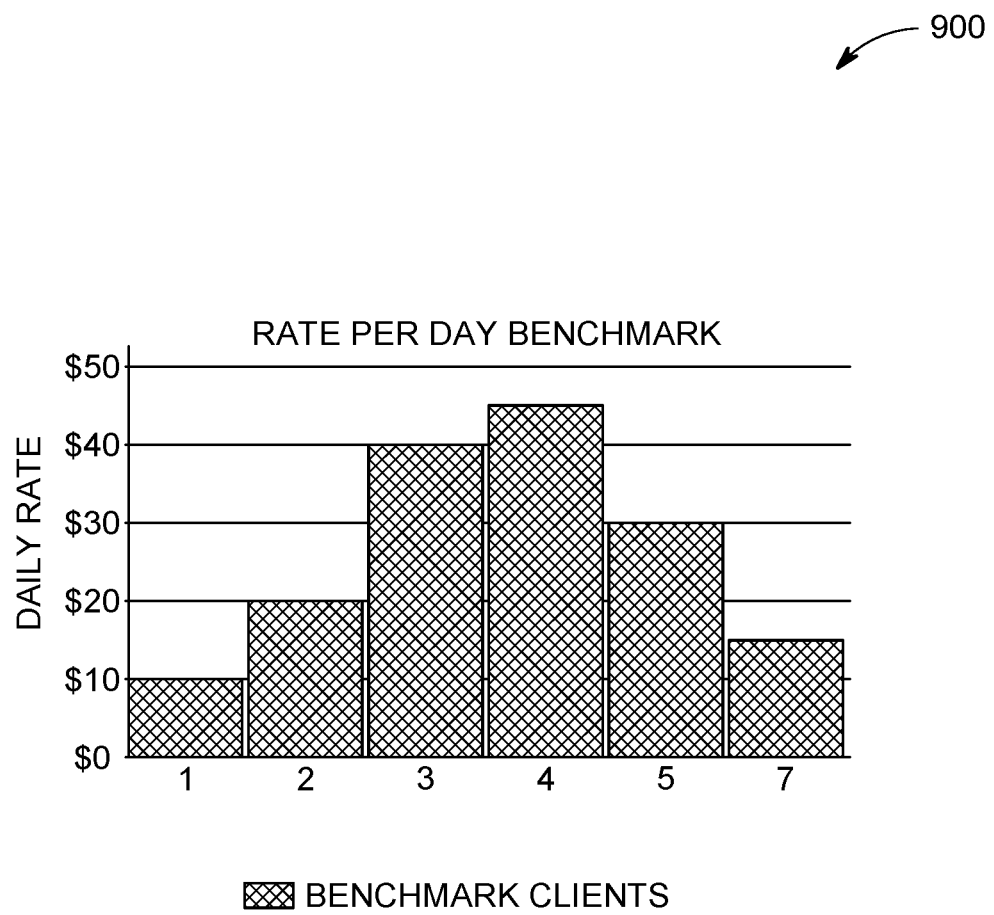
FIG. 9A-9B are graphs depicting service cost component modeling for strategic negation by an intelligent service negotiation mechanism in accordance with aspects of the present invention.
Figure 9B:
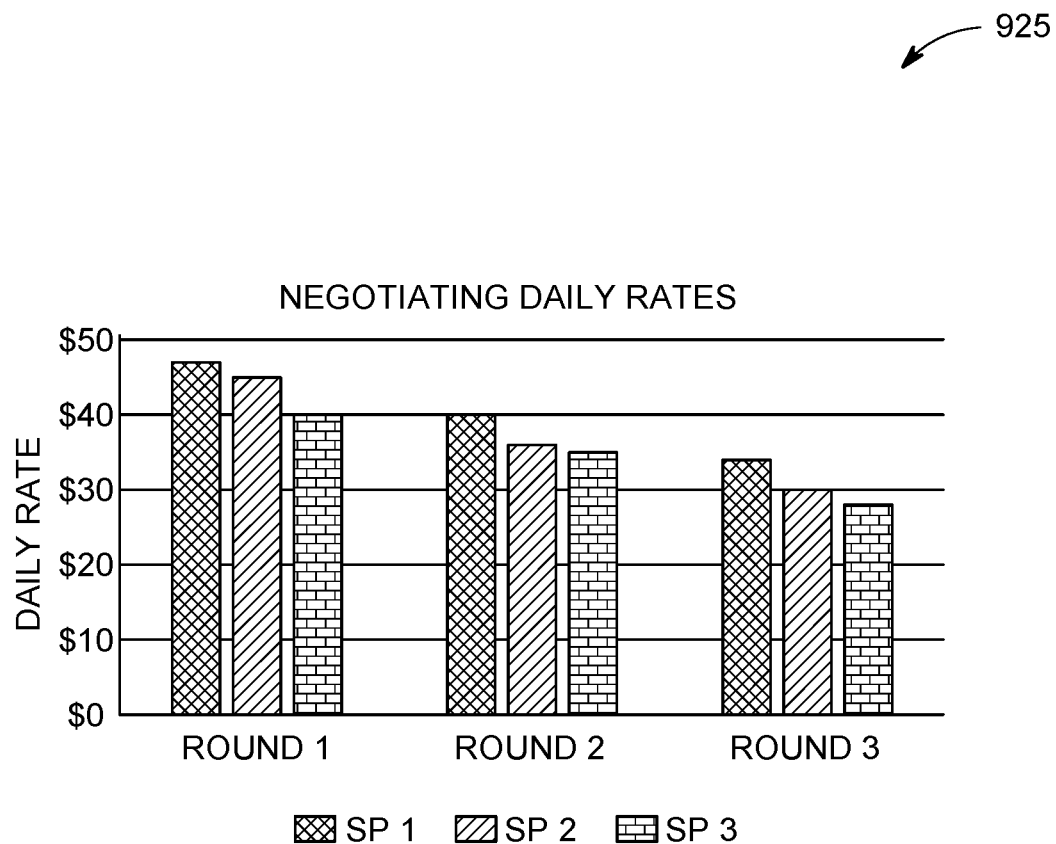

FIG. 9A-9B are graphs 900, 925 depicting service cost component modeling for strategic negation by an intelligent service negotiation mechanism. For example, FIG. 9A depicts graph chart 900 that compares a client rate per day as compared to a cognitively learned and established benchmark rate per day via the intelligent service negotiation mechanism, which may be included as a visual illustration via a GUI in a web portal in a negotiation model for cognitively consulting a user. FIG. 9B depicts graph chart 925 that depicts one or more service providers ("SP") (e.g., SP 1, SP 2, and SP 3) average rate per day with one or more rounds (e.g., negotiation instances between a service provider and a user) that measure the negotiation success acquired via feedback into a machine learning mechanism upon the user using one or more consultative recommendations for selecting the service by the one or more service providers according to the cognitive consultation of the intelligent service negotiation mechanism according to the negotiation model. A GUI in a web portal may be used to depict the graph in a negotiation model.

Turning now to FIG. 10 is a chart diagram 1000 for service provider shift modeling depicting use of cognitive actions and dependencies by an intelligent service negotiation mechanism. That is, chart diagram 1000 may include an action, a result, and a corresponding dependency relating to the action and/or result. Using the action item "rebate negotiation" in chart diagram 1000, by way of illustration only, intelligent service negotiation mechanism may learn an action relating to rebate negotiation. The rebate, for example, may increase from 5% to 10%. Also, the intelligent service negotiation mechanism may associate with the rebate negotiation action that a service provider (e.g., supplier) considers/counts a market rate revenue in the rebate. Thus, the intelligent service negotiation mechanism may provide for learning and understanding cognitive actions and dependencies so as to achieve service provider cost component savings besides mere numerical analysis.

FIG. 11 is a chart diagram 1100 for a service provider shift modeling depicting use of artificial intelligence data gathering by an intelligent service negotiation mechanism. The intelligent service negotiation mechanism may collect and gather intelligence from one or more data sources so as to learn and incorporate up-to-date, real-time market intelligence pertaining to one or more service providers. For example, the intelligent service negotiation mechanism may learn and cognitively analyze a news/broadcast report that a commercial airline is merging with another commercial airline. Using this collected data, the intelligent service negotiation system may cognitively generate and/or update a negotiation model based on the collected data. For example, the intelligent service negotiation mechanism may predict a plurality of outcomes for more on or more negotiation models to cognitively consult a user about learned, market intelligence that may impact (e.g., negative impact and/or positive impact) one or more service provider cost components.

Figure 12:
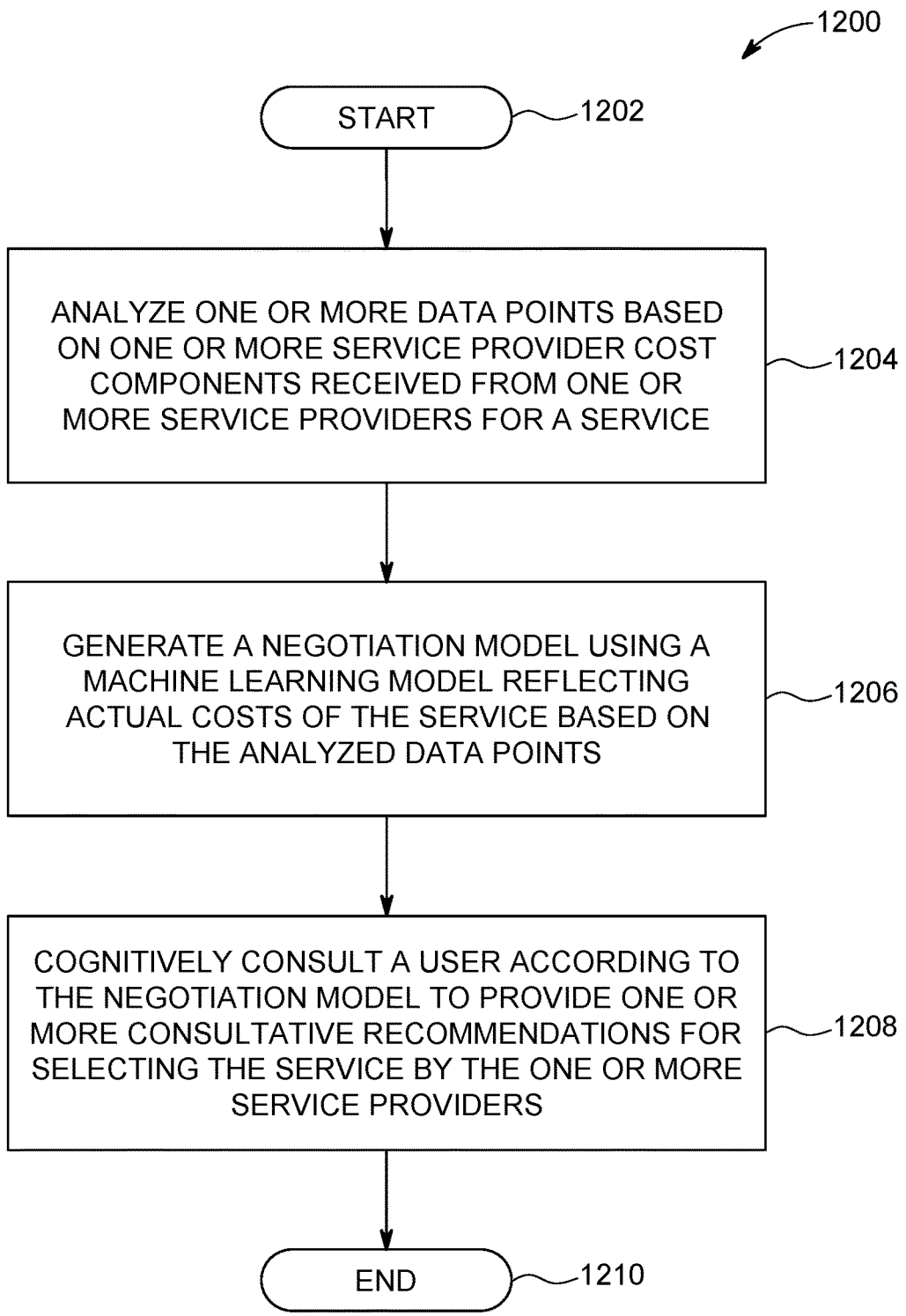
FIG. 12 is a flowchart diagram depicting an exemplary method for intelligent service negotiation in a cloud-computing environment, again in which various aspects of the present invention may be realized.

Turning now to FIG. 12, a method 1200 for intelligent service negotiation by a processor within a cloud computing environment, by a processor, is depicted. In one aspect, each of the devices, components, modules, operations, and/or functions described in FIGS. 1-11 also may apply or perform one or more operations or actions of FIG. 12. The functionality 1200 may be implemented as a method executed as instructions on a machine, where the instructions are included on at least one computer readable medium or one non-transitory machine readable storage medium. The functionality 1200 may start in block 1202. One or more data points may be analyzed based on one or more service provider cost components received from one or more service providers for a service, as in block 1204. A negotiation model may be generated using a machine learning model reflecting actual costs of the service based on the analyzed data points, as in block 1206. A user may be cognitively consulted according to the negotiation model to provide one or more consultative recommendations for selecting the service by the one or more service providers, as in block 1208. The functionality 1200 may end, as in block 1210.

In one aspect, in conjunction with and/or as part of at least one block of FIG. 12, the operations of method 1200 may include each of the following. The operations of method 1200 may include, as part of or in association with generating the negotiation model by, initializing a machine learning mechanism using feedback information to detect one or more changes to the one or more service provider cost components effecting the negotiation model. The operations of method 1200 may include, as part of or in association with generating the negotiation model by, receiving as the one or more service provider cost components current service cost components, proposed service cost components, and benchmarked service cost components, and/or assigning at least a portion of the service to be performed by one of the one or more service providers according to a defined percentage rate.

The operations of method 1200 may include, as part of or in association with cognitively consulting the user by, providing the one or more consultative recommendations based on the negotiation model, or an updated negotiation model according to one or more changes to the one or more service provider cost components, either by an interactive graphical user (GUI) interface or an interactive voice dialog component associated with the interactive GUI interface. The interactive GUI interface and the interactive voice dialog component may be associated with an internet-based computer.

The operations of method 1200 may include, as part of or in association with cognitively consulting the user by, collecting feedback information via an interactive graphical user interface (GUI) from the user or the one or more service providers according to the negotiation model or an updated negotiation model.

The operations of method 1200 may include alerting the user upon detecting one or more changes to the negotiation model, wherein the negotiation model includes the one or more service provider cost components and a plurality of dependency requirements associated with the one or more service provider cost components.

Figure 13:
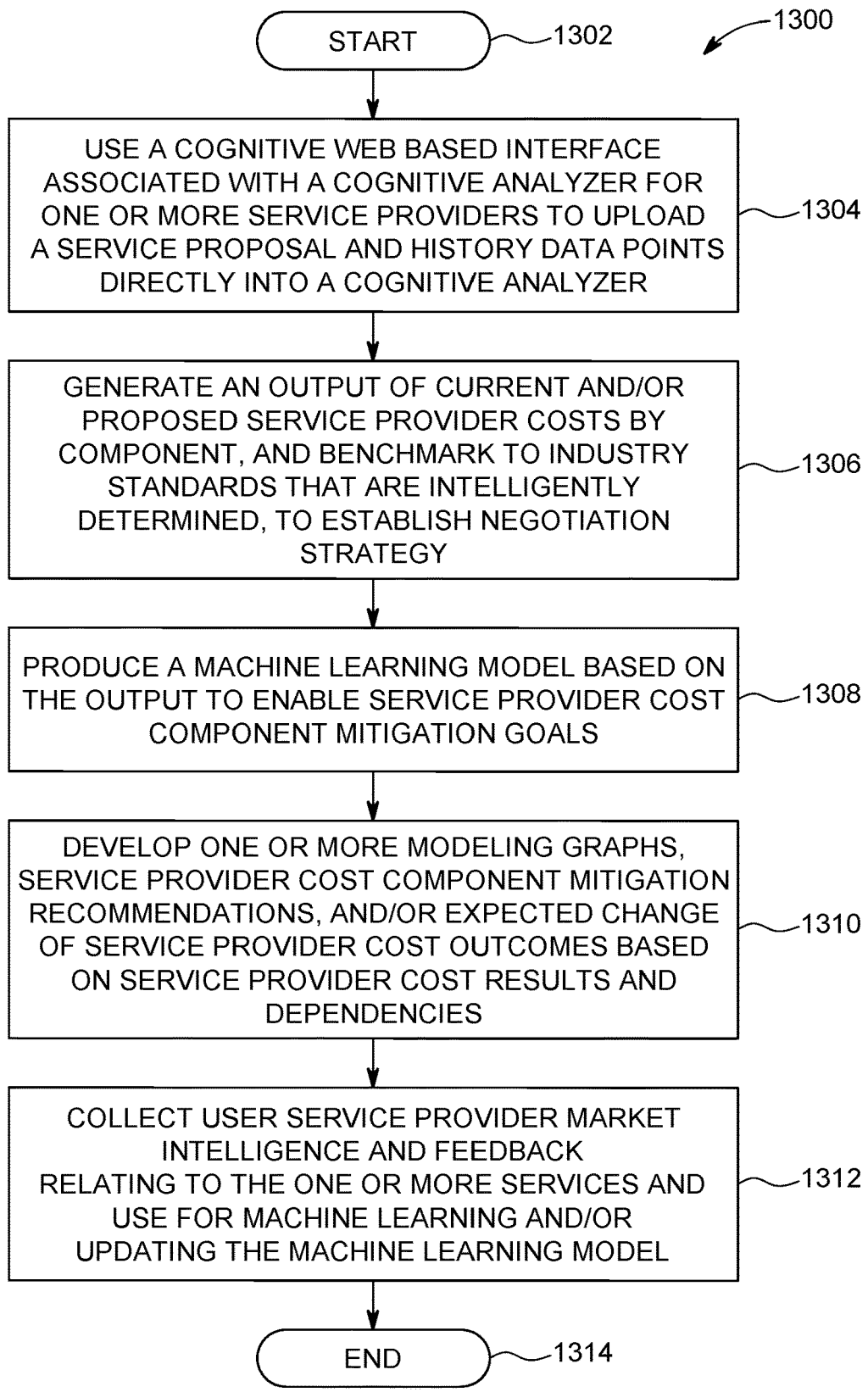
FIG. 13 is a flowchart diagram depicting an exemplary method for intelligent service negotiation in a cloud-computing environment, again in which various aspects of the present invention may be realized.

Turning now to FIG. 13, a method 1300 for intelligent service negotiation by a processor within a cloud computing environment, by a processor, is depicted. In one aspect, each of the devices, components, modules, operations, and/or functions described in FIGS. 1-12 also may apply or perform one or more operations or actions of FIG. 13. The functionality 1300 may be implemented as a method executed as instructions on a machine, where the instructions are included on at least one computer readable medium or one non-transitory machine readable storage medium. The functionality 1300 may start in block 1302. A cognitive web based interface associated with a cognitive analyzer may be used for one or more service providers to upload a service proposal and history data points directly into the cognitive analyzer, as in block 1304. An output of current and/or proposed service provider costs by component may be generated and benchmarked, to industry standards that are intelligently determined, to establish negotiation strategy, as in block 1306. A machine learning model is generated based on the output to enable service provider cost component mitigation goals, as in block 1308. One or more modeling graphs, service provider cost component mitigation recommendations, and/or expected change of service provider cost outcomes based on service provider cost results and dependencies may be developed, as in block 1310. Service provider market intelligence and feedback relating to the one or more services may be collected and used for machine learning and/or updating the machine learning model, as in block 1312. The functionality 1300 may end, as in block 1314.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for intelligent service negotiation by a processor within a cloud computing environment, comprising:
analyzing one or more data points based on one or more service provider cost components received from one or more service providers for a service;
generating a negotiation model using a machine learning model reflecting actual costs of the service based on the analyzed data points, wherein the negotiation model factors a predicted impact to the actual costs of the service resulting from a market share adjustment of the one or more service provider cost components from one of the one or more service providers to an alternative one of the one or more service providers; and
cognitively consulting a user according to the negotiation model to provide one or more consultative recommendations for selecting the service by the one or more service providers.

2. The method of claim 1, wherein generating the negotiation model includes initializing a machine learning mechanism using feedback information to detect one or more changes to the one or more service provider cost components effecting the negotiation model.

3. The method of claim 1, wherein generating the negotiation model includes receiving as the one or more service provider cost components current service cost components, proposed service cost components, and benchmarked service cost components.

4. The method of claim 1, wherein generating the negotiation model includes assigning at least a portion of the service to be performed by one of the one or more service providers according to a defined percentage rate.

5. The method of claim 1, wherein cognitively consulting the user includes providing the one or more consultative recommendations based on the negotiation model, or an updated negotiation model according to one or more changes to the one or more service provider cost components, either by an interactive graphical user (GUI) interface or an interactive voice dialog component associated with the interactive GUI interface, wherein the interactive GUI interface and the interactive voice dialog component are associated with an internet-based computer.

6. The method of claim 1, wherein cognitively consulting the user includes collecting feedback information via an interactive graphical user interface (GUI) from the user or the one or more service providers according to the negotiation model or an updated negotiation model.

7. The method of claim 1, further including alerting the user upon detecting one or more changes to the negotiation model, wherein the negotiation model includes the one or more service provider cost components and a plurality of dependency requirements associated with the one or more service provider cost components.

8. A system for intelligent service negotiation within a cloud computing environment, comprising:
one or more computers with executable instructions that when executed cause the system to:
analyze one or more data points based on one or more service provider cost components received from one or more service providers for a service;
generate a negotiation model using a machine learning model reflecting actual costs of the service based on the analyzed data points, wherein the negotiation model factors a predicted impact to the actual costs of the service resulting from a market share adjustment of the one or more service provider cost components from one of the one or more service providers to an alternative one of the one or more service providers; and
cognitively consult a user according to the negotiation model to provide one or more consultative recommendations for selecting the service by the one or more service providers.

9. The system of claim 8, wherein generating the negotiation model includes:
initializing a machine learning mechanism using feedback information to detect one or more changes to the one or more service provider cost components effecting the negotiation model; and
receiving as the one or more service provider cost components current service cost components, proposed service cost components, and benchmarked service cost components.

10. The system of claim 8, wherein generating the negotiation model includes assigning at least a portion of the service to be performed by one of the one or more service providers according to a defined percentage rate.

11. The system of claim 8, wherein cognitively consulting the user includes providing the one or more consultative recommendations based on the negotiation model, or an updated negotiation model according to one or more changes to the one or more service provider cost components, either by an interactive graphical user (GUI) interface or an interactive voice dialog component associated with the interactive GUI interface, wherein the interactive GUI interface and the interactive voice dialog component are associated with an internet-based computer.

12. The system of claim 8, wherein cognitively consulting the user includes collecting feedback information via an interactive graphical user interface (GUI) from the user or the one or more service providers according to the negotiation model or an updated negotiation model.

13. The system of claim 8, wherein the executable instructions further alert the user upon detecting one or more changes to the negotiation model, wherein the negotiation model includes the one or more service provider cost components and a plurality of dependency requirements associated with the one or more service provider cost components.

14. A computer program product for, by a processor, intelligent service negotiation within a cloud computing environment, the computer program product comprising a non-transitory computer-readable storage medium having computer-readable program code portions stored therein, the computer-readable program code portions comprising:
an executable portion that analyzes one or more data points based on one or more service provider cost components received from one or more service providers for a service;
an executable portion that generates a negotiation model using a machine learning model reflecting actual costs of the service based on the analyzed data points, wherein the negotiation model factors a predicted impact to the actual costs of the service resulting from a market share adjustment of the one or more service provider cost components from one of the one or more service providers to an alternative one of the one or more service providers; and
an executable portion that cognitively consults a user according to the negotiation model to provide one or more consultative recommendations for selecting the service by the one or more service providers.

15. The computer program product of claim 14, wherein generating the negotiation model includes initializing a machine learning mechanism using feedback information to detect one or more changes to the one or more service provider cost components effecting the negotiation model.

16. The computer program product of claim 14, wherein generating the negotiation model includes receiving as the one or more service provider cost components current service cost components, proposed service cost components, and benchmarked service cost components.

17. The computer program product of claim 14, wherein generating the negotiation model includes assigning at least a portion of the service to be performed by one of the one or more service providers according to a defined percentage rate.

18. The computer program product of claim 14, wherein cognitively consulting the user includes providing the one or more consultative recommendations based on the negotiation model, or an updated negotiation model according to one or more changes to the one or more service provider cost components, either by an interactive graphical user (GUI) interface or an interactive voice dialog component associated with the interactive GUI interface, wherein the interactive GUI interface and the interactive voice dialog component are associated with an internet-based computer.

19. The computer program product of claim 14, wherein cognitively consulting the user includes collecting feedback information via an interactive graphical user interface (GUI) from the user or the one or more service providers according to the negotiation model or an updated negotiation model.

20. The computer program product of claim 14, further including an executable portion that alerts the user upon detecting one or more changes to the negotiation model, wherein the negotiation model includes the one or more service provider cost components and a plurality of dependency requirements associated with the one or more service provider cost components.

* * * * *